(12) United States Patent
Thomas et al.

(10) Patent No.: US 8,983,844 B1
(45) Date of Patent: Mar. 17, 2015

(54) TRANSMISSION OF NOISE PARAMETERS FOR IMPROVING AUTOMATIC SPEECH RECOGNITION

(75) Inventors: Ryan P. Thomas, Redmond, WA (US); Nikko Strom, Kirkland, WA (US)

(73) Assignee: Amazon Technologies, Inc., Reno, NV (US)

( * ) Notice: Subject to any disclaimer, the term of this patent is extended or adjusted under 35 U.S.C. 154(b) by 289 days.

(21) Appl. No.: 13/562,476

(22) Filed: Jul. 31, 2012

(51) Int. Cl.
*G10L 21/00* (2013.01)

(52) U.S. Cl.
USPC ................ 704/270.1; 704/233; 704/226

(58) Field of Classification Search
USPC .............. 704/275, 226, 256, 256.2, 233, 235, 704/231, 270, 270.1; 379/406.01
See application file for complete search history.

(56) References Cited

U.S. PATENT DOCUMENTS

| | | | | |
|---|---|---|---|---|
| 6,163,608 A | * | 12/2000 | Romesburg et al. | 379/406.01 |
| 7,603,276 B2 | * | 10/2009 | Yoshizawa | 704/256.2 |
| 2013/0185078 A1 | * | 7/2013 | Tzirkel-Hancock et al. | 704/275 |

* cited by examiner

*Primary Examiner* — Huyen X. Vo
(74) *Attorney, Agent, or Firm* — Lowenstein Sandler LLP

(57) ABSTRACT

Methods and systems for transmission of noise parameters for improving automatic speech recognition are disclosed. A system includes one or more microphones, wherein each microphone is configured to produce an audio signal. The system also includes a noise reduction module configured to generate a noise-reduced audio signal and a noise parameter. Furthermore, the system includes a transmitter configured to transmit, to a computing device, the noise-reduced audio signal and a noise parameter. The computing device may use the noise parameter in obtaining a model to use for performing automatic speech recognition.

21 Claims, 6 Drawing Sheets

TRANSMISSION OF NOISE PARAMETERS FOR IMPROVING AUTOMATIC SPEECH RECOGNITION

BACKGROUND

There are currently many devices that provide speech recognition capability. Some of these devices apply noise reduction processing to the recorded audio to remove noise from the received audio signal. The noise may include environmental noise or may also include echoes of the targeted speech signal due to reverberation caused by room acoustics. The cleaned-up audio signal may then be sent to another remote device. In some cases, the remote device may apply automatic speech recognition (ASR) to the received audio signal. ASR is a technology that transcribes spoken words to text. With ASR there is a high correlation between the accuracy of the words-to-text conversion and the clarity of the received audio signal being transcribed.

BRIEF DESCRIPTION OF THE DRAWINGS

Embodiments of the invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Methods and systems for transmission of noise reduction parameters for improving automatic speech recognition are disclosed.

Embodiments of the invention provide a user device for transmission of noise parameters for improving automatic speech recognition. In one embodiment, a user device includes microphones that capture speech or other audio from the surrounding environment and produce audio signals that that may be processed by the user device. The user device also includes a noise reduction module configured to generate a noise-reduced version of the audio signal. In order to generate the noise-reduced audio signal, the user device applies a noise reduction algorithm to the audio signal. In applying the noise reduction algorithm, one or more noise parameters may be generated. The noise parameters may, for example, describe the noise in the signal, may characterize the processing done to the signal, or may be opaque in that the noise parameters do not represent any clearly defined characteristic. In embodiments of the implementation, the user device sends these noise parameters along with the noise-reduced audio signal to a server device for ASR processing.

In some embodiments of the invention, a server device receives the noise-reduced audio signal and the noise parameters from the user device via a network. The server device may then perform automatic speech recognition (ASR) on the received audio signal to convert it into text. The server device may use the noise parameters to adapt the ASR algorithms or models to optimize the accuracy of the recognized text. For example, the server may adapt an existing ASR model using the noise parameters or may select an ASR model from a plurality of ASR models using the noise parameters.

In one embodiment, the server device has multiple ASR models available and the noise parameters may be used to select a model to use for the ASR conversion. Standard machine learning techniques can be used to cluster sets of noise parameters to identify classes of similar environments for audio files. In one embodiment, an ASR model may be associated with a respective noise parameter model. For example, each noise parameter model may be created by clustering noise parameters that come from similar noise environments and perform well with the corresponding ASR model. An ASR model may be selected based on a comparison between the noise parameters and the noise parameter model associated with the ASR model. The server may then perform ASR processing on the noise-reduced audio signal using the selected ASR model to generate ASR results. The server device can also apply noise reduction algorithms to the noise-reduced version of the audio signal to further clean up the audio signal for purposes of ASR processing.

Figure 1:
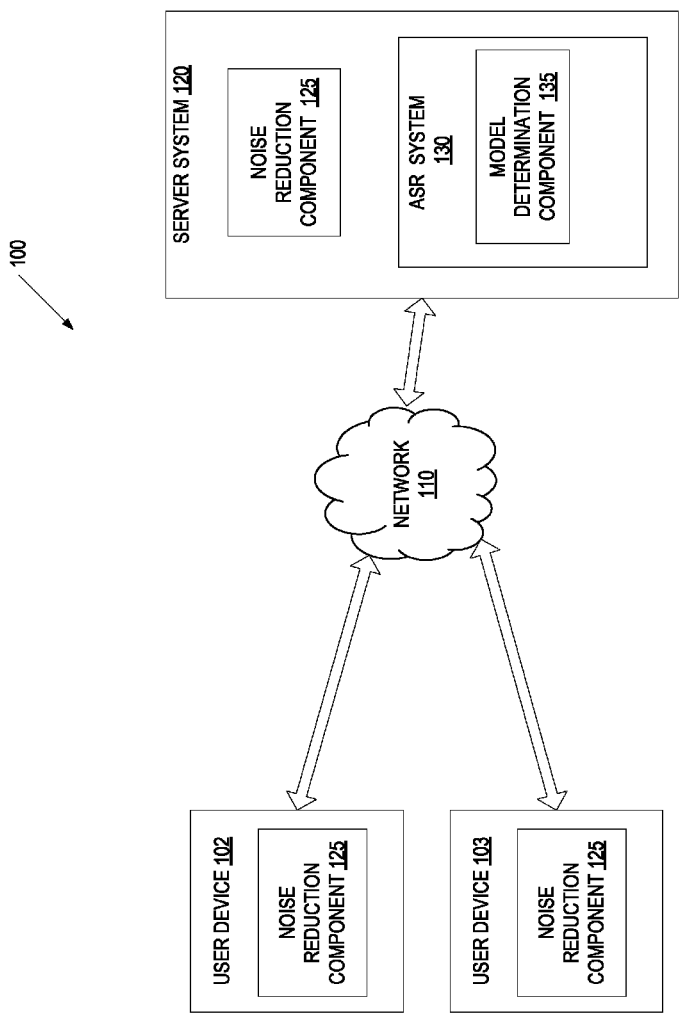
FIG. 1 is a block diagram of an exemplary network architecture, in accordance with one embodiment of the present invention.

FIG. 1 is a block diagram of an exemplary network architecture 100 in which embodiments described herein may operate. The network architecture 100 may include a server system 120 and one or more user devices 102-103 capable of communicating with the server system 120 and/or other user devices 102-103 via a network 110 (e.g., a public network such as the Internet or a private network such as a local area network (LAN)). The user devices 102-103 may include any type of computing device, such as electronic book readers, portable digital assistants, mobile phones, laptop computers, portable media players, tablet computers, cameras, video cameras, netbooks, notebooks, desktop computers, web cameras, gaming consoles, DVD players, media centers, interactive televisions (TVs), and the like.

Communication between the server system 120 and a user device 102, 103 may be enabled via any communication infrastructure. Examples of such an infrastructure include a combination of a local area network (LAN), wide area network (WAN), a VPN, and wireless infrastructure. The communication infrastructure may be provided by a network operator (service provider) system that can be implemented using various data processing equipment, communication towers, etc. Alternatively, or in addition, the network operator system may rely on satellite technology to exchange information with the user device 102, 130. Yet alternatively, or in combination, the communication infrastructure may be provided by an access point (e.g., WiFi access point) provider system. In a further embodiment, the communication infrastructure may be hardwired communication links, such as an Ethernet or Fiber Optic connection.

The server system 120 may include one or more machines (e.g., one or more server computer systems, routers, gateways, etc.). Server system 120 may additionally act as a signal processing engine for the user devices 102-103. When acting as a signal processing engine, server system 120 may receive audio signals from a user device, process the audio signals (e.g., adjust them to compensate for background noise), apply automated speech recognition (ASR) to the audio signal to generate ASR results, and/or transmit the adjusted audio signals and ASR results back to the user device 102-103 or to another user device 102-103.

ASR results may take any form known to one of skill in the art. For example, ASR results may be a transcription of the received speech, an N-best list of the top N most likely transcriptions, or a lattice that contains multiple transcriptions. In some embodiments, the ASR results may be processed by a natural language processing/understanding module, and the ASR results may be in the form of a command or a symbolic representation of the meaning of the received speech.

In one embodiment, the user devices 102, 103 and/or the server system 120 include a noise reduction component 125. The noise reduction component 125 in a user device 102-103 may analyze audio signals received by one or more microphones and perform one or more noise reduction algorithms that run in software or on a hardware module of the user device. The noise reduction component 125 may also generate one or more noise parameters that relate to the noise present in the audio signal or the algorithms used to reduce the noise. The user device 102-103 can then transmit a resulting noise-reduced audio signal to the server system 120 and/or to one or more other user devices 102-103.

In some embodiments, the noise reduction algorithms applied by noise reduction component 125 may include echo cancellation, dereverberation, beamforming, and blind source separation, noise cancellation, and spectral shaping, to name a few examples. Echo cancellation is a process that samples a received audio signal to create a model of an echo path that is, in turn, used to estimate the echo associated with the audio signal. This estimation is then subtracted from the incoming audio signals to remove the "echo" from the audio signals. Dereverberation is a technique that automatically cancels any reverberation (e.g., multi-path propagation of an audio signal from the source of the audio to the receiving microphone) effect to recover a quality of speech in an audio signal. Beamforming is a signal processing technique used with microphone arrays for directional signal reception. Beamforming is achieved by combining elements in the microphone array in such a way that signals at particular angles experience constructive interference while others experience destructive interference.

Blind source separation is the separation of a set of signals from a set of mixed signals, without the aid of information (or with very little information) about the source signals or the mixing process. Noise cancellation is a method for reducing unwanted sound by emitting a sound wave with the same amplitude but with an inverted phase (antiphase) to the original sound. These waves combine to form a new wave, in a process called interference, and effectively cancel each other out (phase cancellation). Spectral shaping is a process to modify the relative energy in different frequency bands of a signal to invert undesired attenuation of frequency bands as a result of the signal transmission.

While performing the noise reduction algorithms, the noise reduction component 125 may determine noise parameters. For example, the echo cancellation and the dereverberation algorithms may both determine a list of [amplitude, delay] pairs as parameters relating to the noise in the audio signal. Other noise parameters may include, but are not limited to, filter coefficients of applied filters (such as dereverberation filter, Wiener filter, Kalman filter, and so on), spatial information of the audio signal, signal-to-noise ratio of the original signal, signal-to-noise ratio of the denoised signal, number of echoes, time delay, and frequency components of the audio signal.

In some embodiments, the meaning of the noise parameters may be opaque, meaning that they do not translate directly to a physical property of the noise, the room or the speaker's vocal tract in a way that would be usable in improving the ASR via mathematical models of room and vocal tract acoustics. In this case the noise parameters may still be useful for training ASR models as described in more detail below.

In embodiments of the invention, the user device 102-103 may transmit (in addition to the noise-reduced audio signal) the noise parameters to the server system 120. In some embodiments, the user device 102, 103 may transmit information identifying the signal processing algorithm(s) utilized by the user device 102, 103 to generate the noise-reduced audio signal. In such a case, the server system 120 would then be able to identify the received noise parameters as products of a particular noise reduction algorithm and use this information to improve ASR processing. In some embodiments, the user device 102, 103 may transmit the original audio signal (unaltered) received via the microphones of the user 102, 103 to the server system 120. In this case, the server system 120 would be able to perform noise reduction on the audio signal at the server side and thereby produce noise parameters on the server side as well.

In some embodiments, the server system 120 may have greater resources than the user devices 102-103. Accordingly, the server system 120 may implement additional algorithms for processing the audio signal for further noise reduction and/or otherwise adjusting the audio signals that are not available to the user devices 102-103.

In some embodiments, the server system 120 performs automated speech recognition (ASR) on the received noise-reduced audio signal using an ASR system 130. In embodiments of the invention, the server system 120 utilizes the noise parameters associated with a received audio signal to yield more accurate speech-to-text conversion results by the ASR system 130. A high-quality noise-reduced audio signal for an ASR system 130 versus a high-quality noise-reduced audio signal for the human ear may not be the same, and thus the noise reduction techniques may be specifically adapted to improving ASR results. By having the server system 120 handle performing noise reduction algorithms that provide noise-reduced audio signals tailored to the ASR system 130, the user device 102-103 may not have to perform any noise reduction processing.

In addition, the ASR system 130 may include a model determination component 135 to aid in selection and/or adaption of a speech recognition model to be applied by the ASR system 130 that will yield more accurate speech-to-text conversion results. In one embodiment, the model determination component 135 may compare the received noise parameters to clusters of noise parameters corresponding to speech recognition models implemented by the ASR system 130. Based on the received noise parameters, the model determination component 135 can select a particular speech recognition model to be used by the ASR system 130. In other embodiments, the model determination component 135 may use other techniques, such as a neural network or a CART regression tree to adapt and/or select ASR models.

Thus, improved ASR results may be achieved by having a user device 102-103 transmit noise parameters, along with the noise-reduced audio signal, to the server system 120. In some embodiments, the functionality of server system 120 may be incorporated into the user device 102, 103 and all of the operations of server system 120 may be performed by the user device 102, 103.

Figure 2:
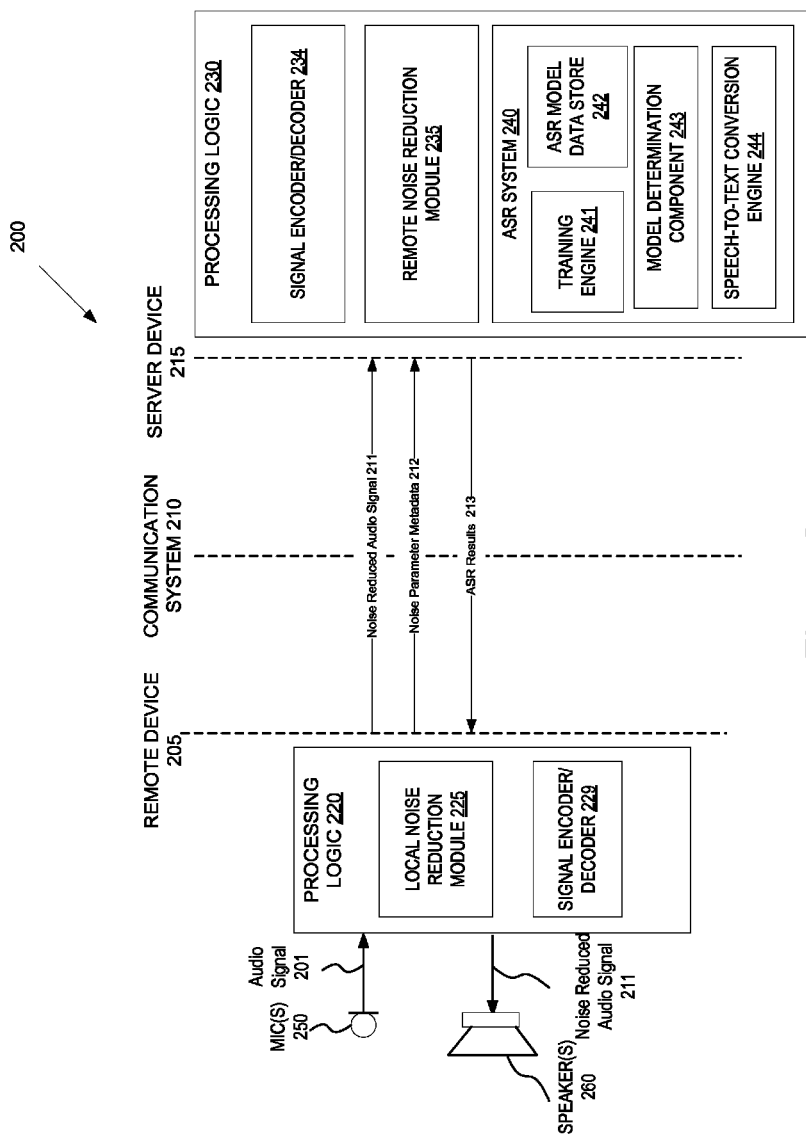
FIG. 2 is a block diagram of one embodiment of an infrastructure for communications and processing between a remote device and a server device.

FIG. 2 is a block diagram of one embodiment of an infrastructure 200 for communications and processing between a remote device 205 and a server device 215. In one embodiment, remote device 205 corresponds to user device 102-103 and server device 215 corresponds to server system 120 of FIG. 1. These devices 205, 215 may communicate via a communication system 210. The communication system 210 may be a connection using a wired network or a wireless network, such as WiFi, GSM, CDMA, WCDMA, TDMA, UMTS, or LTE In one embodiment, remote device 205 includes one or more microphones (mics) 250, speakers 260, and processing logic 220. The microphones 250 may include microphones internal to the remote device 205 and/or microphones communicably coupled to the remote device 205 via a wired or wireless (e.g. Bluetooth) connection. The processing logic 220 may be implemented as modules programmed for a general processing device or as dedicated chipsets. The microphones 250 may send an audio signal (or multiple audio signals) 201 (representing audio captured by the microphones 250) to the processing logic 220. In one embodiment, microphones 250 may be an array of microphones configured to transmit an array of signals to processing logic 220.

In one embodiment, processing logic 220 executes a local noise reduction module 225. The local noise reduction module 225 may apply one or more noise reduction algorithms to the incoming audio signals 201 that are received from the one or more microphones 250. The noise-reduction algorithms remove background noise and/or filter the audio signal 201 in order to generate a noise-reduced audio signal 211 and one or more noise parameters as described above. The noise reduction algorithms may include echo cancellation, dereverberation, beamforming, blind source separation, noise cancellation, and spectral shaping, to name a few examples. Signal encoder/decoder 229 then encodes noise-reduced audio signal 211 and noise parameters 212 for transmission to the server device 215.

In one embodiment, server device 215 includes processing logic 230. The processing logic 230 may be implemented as modules programmed for a general processing device or as dedicated chipsets. The processing logic 230 may execute a signal encoder/decoder 234, a remote noise reduction module 235, and an ASR system 240. The server device 215 may utilize the received noise-reduced audio signal 211 and associated received noise parameters 212 to generate more-accurate ASR results at the ASR system 240 of server device 215.

In some embodiments, server device 215 may perform additional noise reduction algorithms to the noise-reduced audio signal 211, to obtain a cleaner audio signal that can, in turn, yield a better speech-to-text conversion by the ASR system 240. In some embodiments, the noise reduction algorithms applied by the remote noise reduction module 235 may be specialized for ASR technology, and may not be the same noise reduction algorithms applied by local noise reduction module 225. Furthermore, applying additional noise reduction algorithms to the noise-reduced audio signal 211 may also produce a second set of noise parameters that can be combined with the received set of noise parameters 212 for selection of a speech recognition model for the ASR system 240.

In one embodiment, the ASR system 240 includes an ASR model data store 242, a model determination component 243, and a speech-to-text conversion engine 244. The ASR model data store 242 may include one or more models that may be used for ASR processing. In some embodiments, ASR model data store 242 may include one or more acoustic models. A model determination component 243 may select an ASR model from ASR model data store 242 using the noise parameters. In some embodiments, the ASR model data store 242 may have a single acoustic model, and the model determination component 243 may adapt the single acoustic model using the noise parameters. In some embodiments, an acoustic model may be both selected and adapted.

In some embodiments, ASR model data store 242 may also include noise parameter models. For example, each acoustic model in the ASR model data store 242 may be associated with a noise parameter model. For example, the noise parameter models may be created through a training procedure using a corpus of audio data as training data. For each utterance in the training data, noise parameters may be determined. In addition, speech recognition may be performed with a plurality of acoustic models. The acoustic model that provides the best performance may be associated with the corresponding noise parameters. After performing this operation for each utterance in the training set, a noise parameter model may be created for each acoustic model through a clustering procedure with the noise parameters associated with the acoustic model from the training procedure. For example, the noise parameter model may be a Gaussian mixture model created by clustering the individual noise parameters that were assigned to the corresponding acoustic model.

Where ASR model data store 242 has acoustic models that are each associated with a noise parameter model, the model determination component 243 may select an acoustic model based on a comparison between the noise parameters and the noise parameter models. For example, in some embodiments, the model determination component 243 may compute a distance function between the noise parameters and each of the noise parameter models and choose the noise parameter model with the shortest distance. In some embodiments, the model determination component 243 may apply a Mahalanobis distance.

In some embodiments, ASR model data store 242 may contain acoustic models where each acoustic model is designed to operate in given range of signal to noise ratios. The received noise parameters may indicate a signal to noise ratio of the audio signal, and the model determination component 243 may select the acoustic model that matches the signal to noise ratio in the noise parameters.

In some embodiments, ASR model data store 242 may contain acoustic models that are each adapted to a profile of a type of room in which the remote device 205 resides, and the noise parameters may describe a profile of the room. For example, the noise parameters may indicate a size of the room, distance between walls in the room, information about echoes generated in the room, an average signal-to-noise ratio in the room, and so on. Increasing the number of noise parameters associated with the remote device 205 may allow for the creation of more detailed and more specific models that may be better adapted to the environment of the room in which the remote device 205 resides.

In some embodiments, ASR model data store 242 may contain a plurality of acoustic models that may be adapted based on the noise parameters. For example, model determination component 243 may select an acoustic model and apply a model-space transformation that is based on the noise parameters. Where the acoustic model is based on a Gaussian mixture model, the model-space transformation may be a linear transformation that adjusts the means and variances of the Gaussian components. For example, the variances of the Gaussian components may be increased to compensate for a low signal-to-noise ratio.

In some embodiments, ASR model data store 242 may contain acoustic models that use noise parameters as features during speech recognition. In performing speech recognition, the audio signal is typically converted to a sequence of feature vectors. For example, the audio signal may be processed to create feature vectors, such as Mel Frequency Cepstral Coefficient (MFCC) feature vectors, perceptual linear predictive (PLP) feature vectors, or neural network feature vectors. Typically, acoustic models may be created using such feature vectors as inputs. In some embodiments, the feature vectors may be augmented by appending the noise parameters to the feature vectors. The augmented feature vectors may then be used to train an acoustic model that incorporates information about the noise parameters. Where the ASR model data store 242 contains an acoustic model trained using features that were augmented with noise parameters, the model determination component 243 may simply select the one available acoustic model. In some embodiments, there may be multiple acoustic models trained using features that were augmented with noise parameters, and the model determination component 243 may select one of the acoustic models using any of the techniques described above.

In some embodiments, the acoustic model created with the augmented feature vectors is a neural network-based acoustic model. In some embodiments, the acoustic model is based on a classification and regression tree (CART) that includes questions about the noise parameters to allow the acoustic model to adapt to the noise parameters.

One skilled in the art will appreciate that embodiments of the invention are not limited to the above examples and any number of modeling techniques may be utilized to aid in ASR model adaption and/or selection based on received noise parameters. Any of the above technique may employ a second set of noise parameters generated by server device 215. Models other than acoustic models may be adapted and/or selected as well. For example, the following components may be adapted and/or selected: a linear discriminant transform, a semi-tied covariance matrix, a decision tree, a feature transformation, or a model transformation. Furthermore, any of the techniques described above may be combined to provide greater flexibility in selecting and/or adapting models.

The ASR system 240 applies the speech recognition model 242 determined by model determination component 243 at the speech-to-text conversion engine 244 to generate ASR results 213 (e.g., a transcription of the received noise-reduced audio signal in the form of text). The ASR results 213 may then be transmitted back to the remote device 205.

In some embodiments, the communication process depicted in FIG. 2 occurs every time the remote device 205 receives audio signals 201 from the microphones 250 associated with the remote device 205. The ongoing communication of noise-reduced audio signal 211 and noise parameters 212 may be used as additional training data to improve the ASR models 242 and the algorithms used by model determination component 243. For example, model determination component 243 may store historical data for all noise parameters associated with the remote device 205 in order to more-precisely tailor ASR models 242 for the remote device 205.

Figure 3:
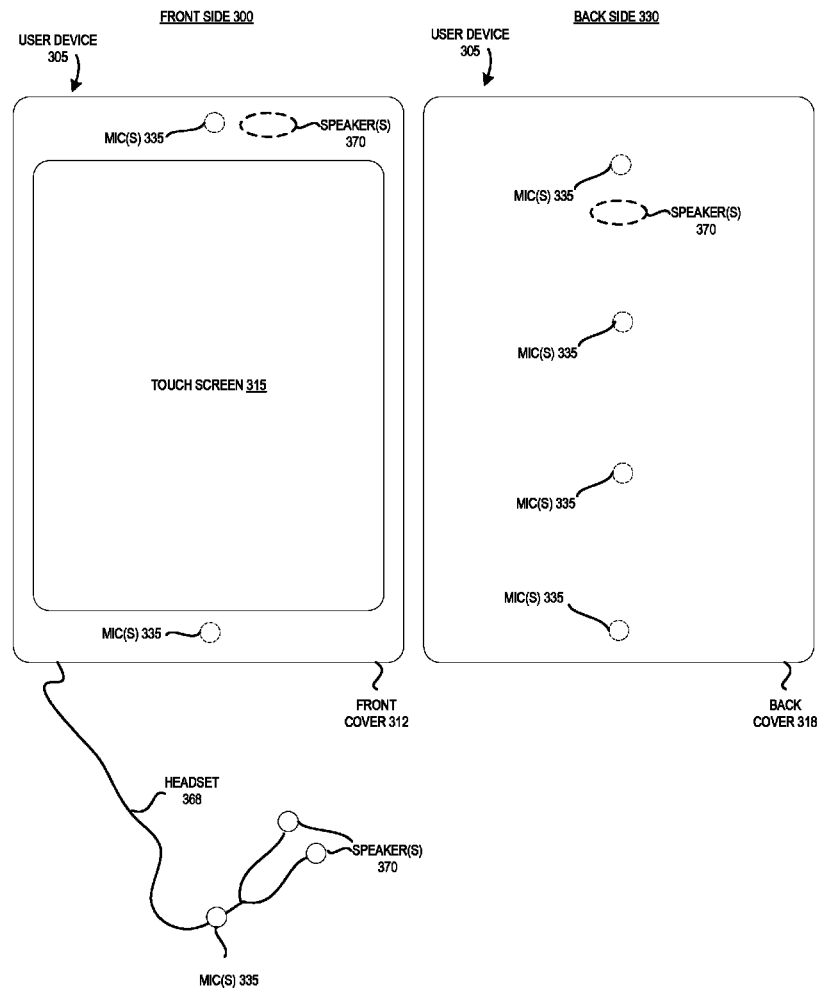
FIG. 3 illustrates an example of a front side and back side of a user device, in accordance with one embodiment of the present invention.

FIG. 3 illustrates a user device 305, in accordance with one embodiment of the present invention. In one embodiment, user device 305 is the same as user devices 102-103 of FIG. 1 and remote device 205 of FIG. 2. A front side 300 and back side 330 of user device 305 are shown. The front side 300 may include a touch screen 315 housed in a front cover 312. The touch screen 315 may use any available display technology, such as electronic ink (e-ink), liquid crystal display (LCD), transflective LCD, light emitting diodes (LED), laser phosphor displays (LSP), and so forth. Note that instead of or in addition to a touch screen, the user device 305 may include a display and separate input (e.g., keyboard and/or cursor control device).

Disposed inside the user device 305 may be one or more microphones (mics) 335 as well as one or more speakers 370. In one embodiment, multiple microphones are used to provide multiple signals that allow noise reduction algorithms to distinguish between a voice of a user of the user device 305 and background noises. Moreover, an array of microphones (e.g., a linear or other array) may be used to more accurately distinguish the user's voice from background noises. The microphones may be arranged in such a way to maximize the ability of noise reduction algorithms to reduce noise in an audio signal.

In one embodiment, a headset 368 is connected to the user device 305. The headset 368 may be a wired headset (as shown) or a wireless headset. A wireless headset may be connected to the user device 305 via WiFi, Bluetooth, Zigbee®, or other wireless protocols. The headset 368 may include speakers 370 and one or more microphones 335.

In one embodiment, the user device 305 may capture an audio signal via microphones 335, apply a noise reduction algorithm to the audio signal to generate a noise-reduced audio signal and resulting noise parameters, and send the noise-reduced audio signal and the noise parameters to a server device in the manner previously described. The server device may then optionally apply further noise reduction techniques in order to yield accurate transcriptions that are sent back to the user device 305. In some embodiments, the server device processing is performed by the user device 305 without the user device 305 sending the noise-reduced audio signal and noise parameters off of the device 305.

Figure 4:
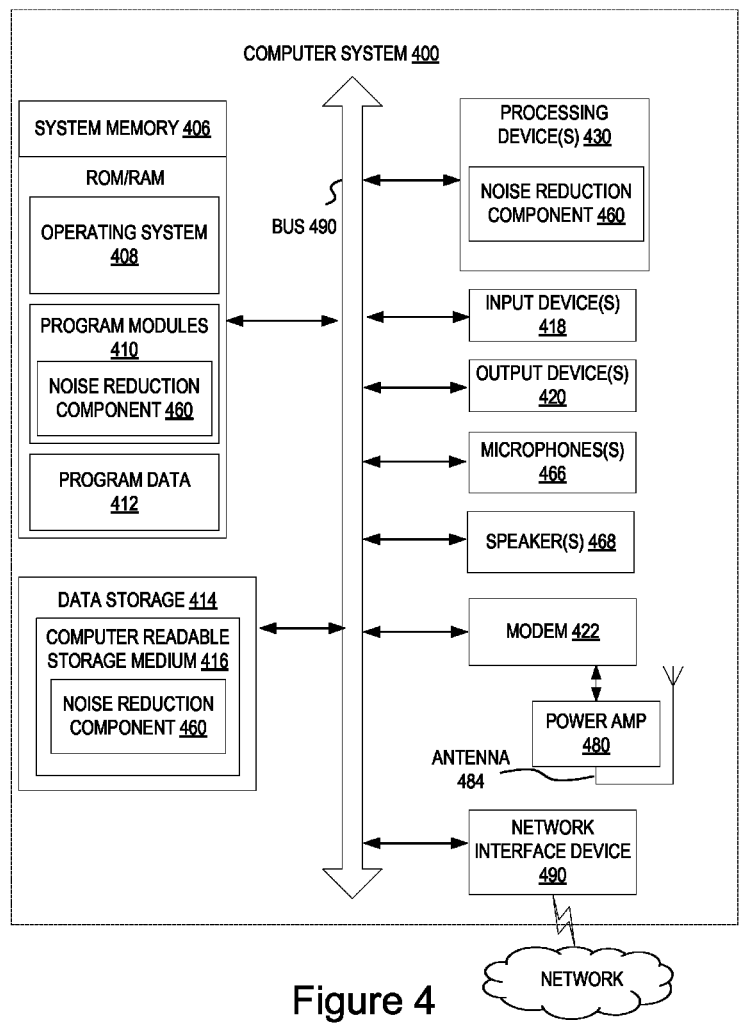
FIG. 4 is a block diagram illustrating an exemplary computer system, in accordance with one embodiment of the present invention.

FIG. 4 is a block diagram illustrating an exemplary computer system 400 configured to perform any one or more of the methodologies described herein. In one embodiment, the computer system 400 corresponds to a user device 102-103 of FIG. 1. For example, computer system 400 may be any type of computing device such as an electronic book reader, a PDA, a mobile phone, a laptop computer, a portable media player, a tablet computer, a camera, a video camera, a netbook, a desktop computer, a gaming console, a DVD player, a computing pad, a media center, and the like. Computer system 400 may also correspond to one or more devices of the server system 120 of FIG. 1. For example, computer system 100 may be a rackmount server, a desktop computer, a network router, switch or bridge, or any other computing device. The computer system 400 may operate in the capacity of a server or a client machine in client-server network environment, or as a peer machine in a peer-to-peer (or distributed) network environment. Further, while only a single machine is illustrated, the computer system 400 shall also be taken to include any collection of machines that individually or jointly execute a set (or multiple sets) of instructions to perform any one or more of the methodologies discussed herein.

The computer system 400 includes one or more processing devices 430, which may include general-purpose processing devices such as central processing units (CPUs), microcontrollers, microprocessors, systems on a chip (SoC), or the like. The processing devices 430 may further include field programmable gate arrays, dedicated chipsets, application specific integrated circuits (ASIC), a field programmable gate arrays (FPGA), digital signal processors (DSP), network processors, or the like. The user device 400 also includes system memory 406, which may correspond to any combination of volatile and/or non-volatile storage mechanisms. The system memory 406 stores information which may provide an operating system component 408, various program modules 410 such as noise reduction component 460, program data 412, and/or other components. The computer system 400 may perform functions by using the processing device(s) 430 to execute instructions provided by the system memory 406. Such instructions may be provided as software or firmware. Alternatively, or additionally, the processing device(s) 430 may include hardwired instruction sets (e.g., for performing functionality of the noise reduction component 460). The processing device 430, system memory 406 and additional components may communicate via a bus 490.

The computer system 400 also includes a data storage device 414 that may be composed of one or more types of removable storage and/or one or more types of non-removable storage. The data storage device 414 includes a computer-readable storage medium 416 on which is stored one or more sets of instructions embodying any one or more of the methodologies or functions described herein. As shown, instructions for the noise reduction component 460 may reside, completely or at least partially, within the computer readable storage medium 416, system memory 406 and/or within the processing device(s) 430 during execution thereof by the computer system 400, the system memory 406 and the processing device(s) 430 also constituting computer-readable media.

While the computer-readable storage medium 416 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The user device 400 may also include one or more input devices 418 (keyboard, mouse device, specialized selection keys, etc.) and one or more output devices 420 (displays, printers, audio output mechanisms, etc.). In one embodiment, the computer system 400 is a user device that includes one or more microphones 466 and one or more speakers 468.

The computer system may additionally include a modem 422 to allow the computer system 400 to communicate via a network (e.g., such as provided by a wired or wireless communication system) with other computing devices, such as remote user devices, a server system, and so forth. The modem 422 allows the computer system 400 to handle both voice and non-voice communications (such as communications for text messages, multimedia messages, media downloads, web browsing, etc.) with a communication system. The modem 422 may provide network connectivity using any type of wired or wireless network technology including, for example, cellular digital packet data (CDPD), general packet radio service (GPRS), enhanced data rates for GSM evolution (EDGE), universal mobile telecommunications system (UMTS), 1 times radio transmission technology (1×RTT), evaluation data optimized (EVDO), high-speed down-link packet access (HSDPA), WiFi, long term evolution (LTE), worldwide interoperability for microwave access (WiMAX), etc.

In some embodiments, the modem 422 may be a wireless modem and may generate signals and send these signals to power amplifier (amp) 480 for amplification, after which they are wirelessly transmitted via antenna 484. Antenna 484 may be configured to transmit in different frequency bands and/or using different wireless communication protocols. In addition to sending data, antenna 484 may also receive data, which is sent to modem 422 and transferred to processing device(s) 430. Computer system 400 may additionally include a network interface device 490 such as a network interface card (NIC) to connect to a network.

Figure 5:
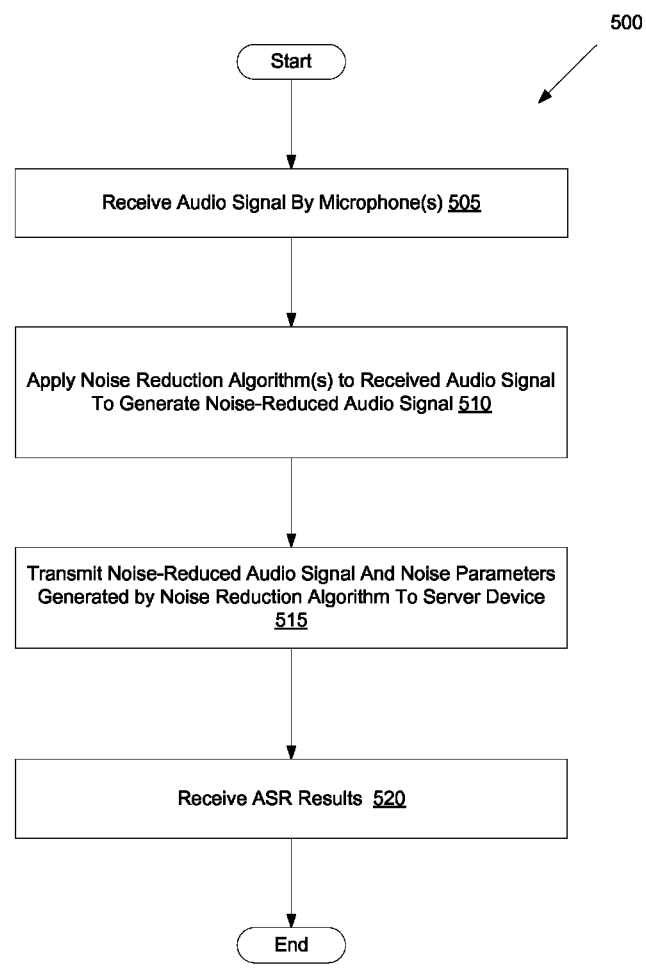
FIG. 5 is a flow diagram showing an embodiment for a method of transmitting noise reduction parameters from a user device.
Figure 6:
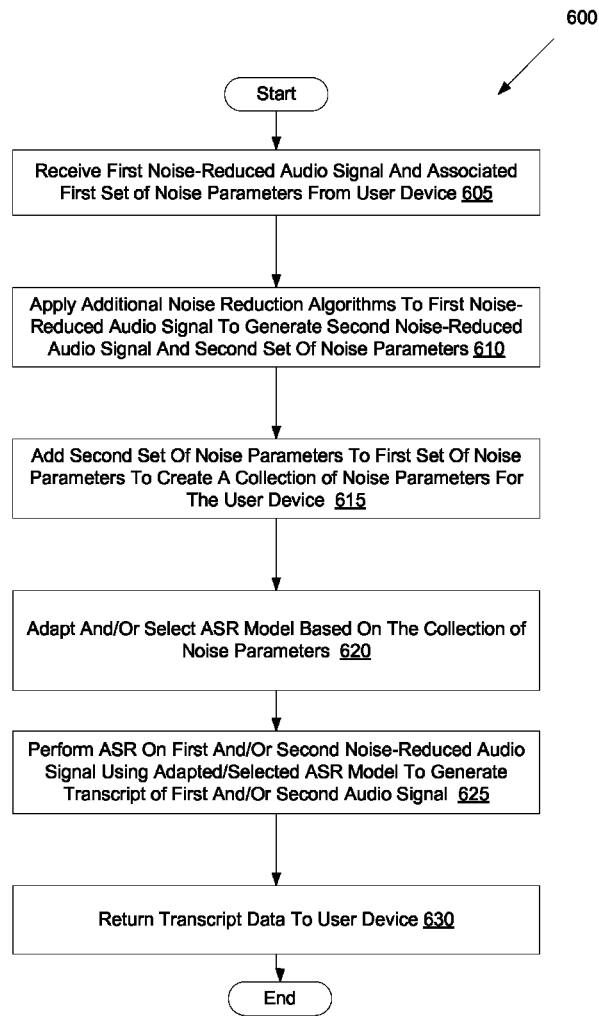
FIG. 6 is a flow diagram showing another embodiment for a method of receiving and processing noise reduction parameters at a server device implementing ASR.

FIGS. 5 and 6 are flow diagrams of some embodiments of methods for transmission of noise reduction parameters for improving automatic speech recognition. The methods are performed by processing logic that may comprise hardware (circuitry, dedicated logic, etc.), software (such as is run on a general purpose computer system or a dedicated machine), or a combination of both.

FIG. 5 is a flow diagram of one embodiment of a method 500 for transmitting noise reduction parameters from a user device. In one embodiment, method 500 is performed by a user device (e.g., user device 102-103 of FIG. 1). Method 500 begins at block 505 where processing logic of the user device receives one or more audio signals from one or more microphones. The one or more microphones may, for example, be part of an array microphone.

Then, at block 510, one or more noise reduction algorithms are applied to the one or more audio signals to generate one or more noise-reduced audio signals and one or more noise parameters. Any noise reduction algorithm known to one of skill in the art may be applied, including any of the noise reduction algorithms discussed above. For example, a noise reduced signal and noise parameters may be generated for each of the audio signals or a single noise reduced signal and single set of noise parameters may be generated by combining all of the audio signals. For example, the noise parameters may characterize the background noise at the user device at the time that the audio was captured, may characterize processing done by a noise reduction algorithm, or may be opaque in that the noise parameters do not represent any clearly defined characteristic. At block 515, processing logic transmits the one or more noise-reduced audio signals and the associated noise parameters to a server device. Lastly, at block 520, ASR results are received at the user device from the server device.

FIG. 6 is a flow diagram of one embodiment of a method 600 for receiving and processing noise reduction parameters at a server device. In one embodiment, method 600 is performed by a server device (e.g., server device 120 of FIG. 1). Method 600 begins at block 605 where processing logic of the server device receives one or more noise-reduced audio signals and associated set noise parameters from a user device. At block 610, the processing logic optionally applies further noise reduction algorithms to the noise-reduced audio signal. These noise reduction algorithms may be in addition to noise reduction algorithms (the same or different algorithms) that were applied at the user device. The application of the additional noise reduction algorithms at the server device may generate a second noise-reduced audio signal and a second set of noise parameters.

At block 615, processing logic may combine the second set of noise parameters with the first set of noise parameters to create a collection of noise parameters that is associated with the second noise-reduced audio signal. As previously discussed, the application of additional noise reduction algorithms by the server device to create the second set of noise parameters may be an optional step taken by the server device. Embodiments of method 600 may also be performed without the application of additional noise reduction algorithms to the received audio signal as described in steps 610 and 615.

At block 620, processing logic adapts and/or selects an ASR model based on the collection of noise parameters. In one embodiment, an ASR model from a plurality of ASR models may be selected using the noise parameters (e.g., matching to a noise parameter model, matching a signal-to-noise ratio, matching a room profile, etc.). In another embodiment, a single ASR model may be adapted using the noise parameters (e.g., applying a linear transformation to a Gaussian mixture model). In other embodiments, an acoustic model may be both selected from a plurality of ASR models and adapted, based on the noise parameters. As steps 610 and 615 are optional, the noise parameters used in step 620 may be only the noise parameters received from the user device or may be a combination of noise parameters received from the user device and noise parameters generated by the server device.

At block 625, processing logic performs ASR on the first and/or second noise-reduced audio signal using the adapted/selected ASR model to produce ASR results (e.g., a transcript of the received audio signal). Lastly, at block 630, the ASR results are returned to the user device.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving, by a server device comprising a processor, a noise-reduced audio signal and a noise parameter from a user device, wherein the noise parameter provides information relating to how noise was reduced in the noise-reduced audio signal;
   selecting, by the server device, a first automatic speech recognition (ASR) model from a plurality of ASR models wherein:
      each ASR model of the plurality of ASR models is associated with a respective noise parameter model, and
      the first ASR model is selected based at least in part on a comparison between the noise parameter and the noise parameter model associated with the first ASR model; and
   performing, by the server device, ASR processing on the noise-reduced audio signal using the first ASR model to generate ASR results.

2. The method of claim 1, wherein the noise parameter is a vector.

3. The method of claim 1, wherein the first ASR model is an acoustic model.

4. The method of claim 1, wherein the comparison is one of a Euclidean distance, a likelihood ratio, or a Mahalanobis distance.

5. The method of claim 1, wherein a first noise parameter model associated with the first ASR model is a Gaussian mixture model.

6. The method of claim 1, wherein the first ASR model minimizes the distance between the noise parameter and the first noise parameter model associated with each ASR model of the plurality of ASR models.

7. The method of claim 1, wherein the noise parameter comprises one or more of a signal to noise ratio, a list of amplitudes and delays, a list of weights, or a list of filter coefficients.

8. The method of claim 1, further comprising transmitting the ASR results to the user device.

9. A system comprising:
one or more microphones configured to produce an audio signal;
a processor to execute a noise reduction module configured to generate a noise-reduced audio signal and a noise parameter based on the audio signal produced by the one or more microphones, wherein the noise parameter provides information relating to how noise was reduced in the noise-reduced audio signal; and
a transmitter configured to transmit, to a server device, the noise-reduced audio signal and the noise parameter, wherein the noise parameter is used by the server device to select an automatic speech recognition (ASR) model to perform ASR processing on the noise-reduced audio signal.

10. The system of claim 9, wherein the server device is further configured to:
compute a plurality of feature vectors from the noise-reduced audio signal;
append the noise parameter to at least one feature vector of the plurality of feature vectors; and
perform the ASR processing using the obtained ASR model and the plurality of feature vectors, wherein the obtained ASR model was trained using at least one feature vector that comprised a noise parameter computed from training data.

11. The system of claim 9, wherein the noise-reduced audio signal is generated by applying a noise reduction algorithm to the audio signals, and wherein the noise-reduction algorithm comprise one of echo cancellation, dereverberation, beamforming, blind source separation, noise cancellation, or spectral shaping.

12. The system of claim 9, wherein the server device is configured to:
obtain an automatic speech recognition (ASR) model using the noise parameter; and
perform ASR processing using the obtained ASR model and the noise-reduced signal to generate ASR results.

13. The system of claim 12, wherein the server device is further configured to obtain an ASR model by selecting an ASR model from a plurality of ASR models.

14. The system of claim 12, wherein the server device is further configured to obtain an ASR model by adapting an existing ASR model.

15. The system of claim 9, wherein the computing device is a server device configured to:
apply one or more noise reduction algorithms to the noise-reduced audio signal to generate a second noise-reduced audio signal and a second noise parameter;
obtain an automatic speech recognition (ASR) model using the second noise parameter; and
perform ASR processing using the obtained ASR model and the second noise-reduced signal to generate ASR results.

16. The system of claim 9, wherein the ASR model is one of a neural network-based acoustic model or a Gaussian mixture model.

17. A non-transitory computer-readable storage medium having instructions that, when executed by a processing device, cause the processing device to perform operations comprising:
receiving, by a server device, a noise-reduced audio signal and a noise parameter from a user device, wherein the noise parameter provides information relating to how noise was reduced in the noise-reduced audio signal;
obtaining an automatic speech recognition (ASR) model using the noise parameter;
performing ASR processing on the noise-reduced audio signal using the obtained ASR model; and
transmitting a result of the ASR processing to the user device.

18. The non-transitory computer-readable storage medium of claim 17, wherein obtaining the ASR model using the noise parameter comprises selecting the ASR model from a plurality of ASR models using the noise parameter.

19. The non-transitory computer-readable storage medium of claim 17, wherein obtaining the ASR model using the noise parameter comprises modifying an existing ASR model using the noise parameter.

20. The non-transitory computer-readable storage medium of claim 17, wherein the noise-reduced audio signal is generated by applying a noise reduction algorithm to an audio signal produced by one or more microphones of the user device, and wherein the noise reduction algorithm is one of echo cancellation, dereverberation, beamforming, blind source separation, noise cancellation, or spectral shaping.

21. The non-transitory computer-readable storage medium of claim 17, wherein the noise parameter comprises one or more of a signal to noise ratio, a list of amplitudes and delays, a list of weights, or a list of filter coefficients.

* * * * *